June 25, 1957 — R. E. DENNEY — 2,796,714
ROTARY DISC TYPE MOWER
Filed Aug. 24, 1953

INVENTOR.
Ralph E. Denney
BY
ATT'YS

United States Patent Office 2,796,714
Patented June 25, 1957

2,796,714
ROTARY DISC TYPE MOWER

Ralph E. Denney, Cincinnati, Ohio, assignor of one-half to Philip Ganson, Cincinnati, Ohio Application August 24, 1953, Serial No. 375,979

6 Claims. (Cl. 56—25.4)

The present invention relates to a power lawn mower and has for an object the provision of a device of this type that is safe and easy to handle, is light in weight and that is arranged to enable it to be conveniently pushed back and forth with one hand after the fashion of a wheeled floor sweeper if desired.

Another object of the invention is to provide a well balanced mower having a single horizontal rotary blade and wherein the supporting wheels are disposed substantially within an exscribed square about the cutting circle of the blade so that hand trimming of grass about obstacles such as structures or standing woody shrubs, trees, etc. is substantially eliminated.

A further object of the invention is to provide a mower that is quiet in operation and that distributes the cut grass evenly and in finely chopped condition over the cutting area.

Still another object of the invention is to provide in a power mower a continuous encircling skirt extending about the blade and arranged with its bottom edge always at a fixed distance from the ground while the cutting plane of the blade is adjustable to various elevations well above the said bottom edge.

It is a special object of the invention to provide in a horizontal rotary blade type power mower an arrangement of a sound deadening rotary disc at a fixed distance above the cutting plane of the blade for simultaneously deflecting the cut grass and centrifugally moving it to the periphery thereof where the chopped cut grass is pneumatically impelled downwardly onto the lawns between the standing grass.

These and other important objects are attained by the means described herein and exemplified in the accompanying drawings, in which.

Figure 1:
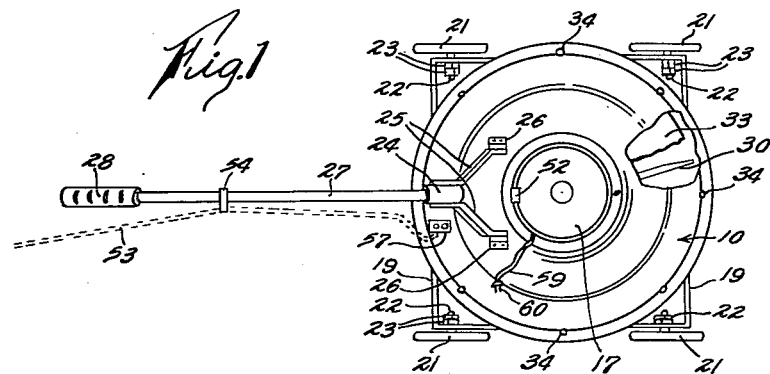
Fig. 1 is a top plane view of an electric lawn mower embodying the invention, part being broken away.
Figure 2:
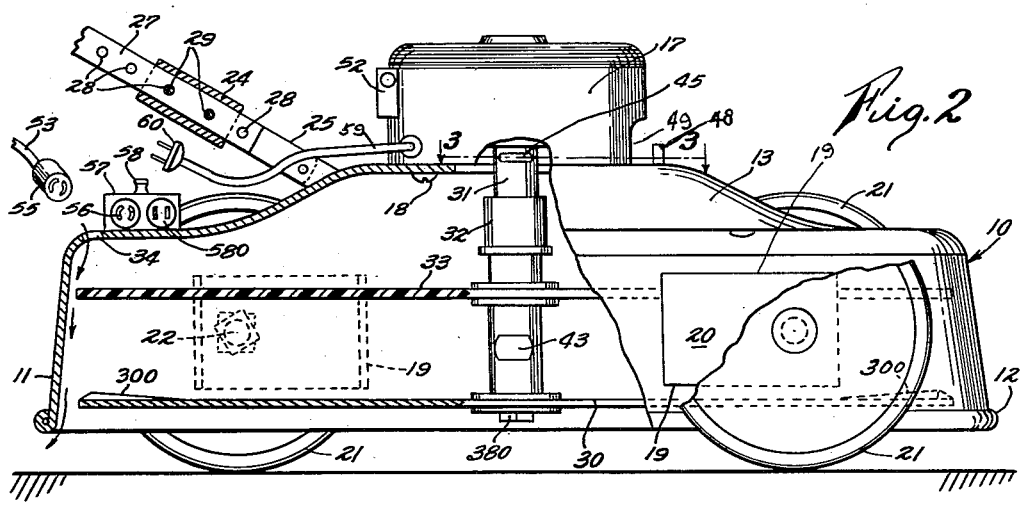
Fig. 2 is an enlarged fragmental side elevational view of the device of Fig. 1, parts being broken away and parts being shown in cross section.

The employment of a horizontally rotating power driven blade is well known in grass cutters or mowers but insofar as can be learned the previously known devices have presented various objectionable and/or dangerous features.

By the arrangement and combination of simple and inexpensive parts hereinafter described the known objections and dangers are avoided and certain new advantages are provided as will be made more fully apparent.

The mower of the invention may be electrically driven as illustrated, or a suitable internal combustion engine (not shown) may be substituted for the electric motor.

Reference is now made to the drawings wherein a domed and generally cylindrical housing 10 of formed sheet metal or other suitable material has a downwardly depending straight side walled skirt 11 terminating in a continuous circular reenforcing bead 12. The domed top 13 of housing 10 has a flat central portion 14 with an aperture 15 and a series of bolt holes 16 surrounding it, whereby a vertical electric motor 17 is attached concentrically on the top of the housing in suitable fashion, for example by bolts 18. In lieu of the electric motor 17 I may employ an internal combustion engine (not shown), the same to be seated and secured in the same manner as said motor 17 if desired.

Metal axle brackets 19 are welded to the exterior of skirt 11, said brackets being in the present embodiment constituted by L-shaped pieces with faces 20 parallel to and well within the sides of an exscribed square about the generally cylindrical skirt 11 so that wheels 21 carried by axles 22 on the respective brackets will also be disposed wholly within the front, rear and side lines of the aforesaid exscribed square about the housing and permit arcuate portions of said housing to extend between the two front wheels and between the two rear wheels as well as between the front and rear wheels at each side of the housing. The axles 22 extend through the wheel hubs and through the brackets where they are secured and fixed by a pair of nuts 23—23.

A tubular sleeve or handle socket 24 is rigidly supported by attached yoke arms 25 which are welded at 26 to the dome portion 13 of the housing 10 and said socket has a handle shaft 27 adjustably secured therein. The extreme end of handle shaft 27 is turned angularly downward and has a hollow handle grip 28 thereon.

It is to be observed that the wheeled housing structure thus far described can be pushed and pulled, back and forth by the operator, who uses one hand for manipulating and guiding the device, somewhat in the manner of a carpet sweeper if desired, with a progressive lateral advance of the housing as this back and forth movement is continued. This type of manipulation is made easy by the use of the rigid handle with a single hand grip in the same vertical plane therewith. This is particularly convenient in the case of an electrically driven mower since the control of a suitable length of connecting cable is greatly simplified by paying out the supply cable sufficiently to permit the lateral traverse of the lawn with a series of push and pull movements. In the present device the forward, rearward and lateral arcuate portions of the housing skirt can always be brought as close to a wall or a tree as it is possible to approach any such obstacles with the wheels 21. In cutting the grass around buildings and trees or shrubbery the necessity or the need for hand trimming is practically eliminated.

It has proved to afford an unusually efficient and rapid maneuverability in a power lawn mower to combine a rigidly attached single grip handle on the housing and provide a wheel support that imposes no limitations on the cutting area with respect to ground obstacles. The handle 27 has a number of longitudinally spaced holes 28 near the forward end so that bolts 29 may pass through the socket member 24 and any two adjacent holes 28 in the handle. The operator may attain a greater or lesser back and forth cutting swath by regulating the adjustment of the handle and its grip to best accommodate the device to the stature of the operator. Since the operator does not maintain the usual relationship of the mower and the operator's person it is to be noted that a fixed and quite narrow spacing of say one inch is maintained constantly between the ground and the continuous circular bead 12 defining the bottom of the housing in order to afford safety and to practically eliminate the possibility of the mower blade 30 reaching a position wherein it can scrape the ground, as sometimes happens when the mower is pushed across an edge of a sloping lawn. Any object higher than say one inch above the ground will engage bead 12 and will either be pushed aside or removed.

The light weight electric motor 17 has its vertical shaft 31 depending concentrically through the hole 15 in the dome 13 of the housing 10 for a distance and the end of the shaft is arranged for the removable attachment of an adapter member 32 to which are removably attached at selected elevations wholly within the vertical limits of skirt 11, a disc 33 that is preferably made of hard pressed and bonded fibrous material in order that it may have the function of dampening sound vibrations in addition to performing its primary functions of centrifugally discharging the chopped grass clippings to the inside periphery of the skirt and assisting in the distribution of a down flow of air that enters holes 34 in the top of the housing and which passes between the periphery of the disc and the inner face of the skirt wall. Said disc also deflects some grass clippings that fly upward from the blade 30 and allows them to be further chopped by the action of the blade. The conjoint action of the blade and disc is to lift grass and like vegetation that has been surrounded by the low lying bead 12 of the skirt by the air lifting action or suction effected by the upwardly turned disposition of the trailing edge of the blade for a distance from each end near the cutting edge diagonally to the trailing edge. The bent portions 300 on the otherwise flat thin blade 30 will lift very tall grass and some weeds that were bent over as the bead 12 passed over them at a short distance of say one inch from the ground. The combined scoop and air lift action allows the grass of various heights to be cut and the clippings thrown and drawn upwardly toward the disc in a considerable zone surrounding the center of the disc from which any finely chopped, normally adherent wet grass particles are constantly thrown centrifugally to avoid accumulation and irregular unloading discharge. The finely chopped clippings are discharged in a relatively well distributed manner about the bottom edge of the skirt 11 and thus provide an improved distribution of the chopped clippings between the standing blades of the grass from which they were initially cut. The currently approved method of mulching and fertilizing of the turf is thus effected in a neat and entirely sightly fashion without necessity of scattering piles of chopped clippings as in prior practice.

The blade 30 and disc 33 are desirably, but not necessarily always spaced at approximately the same distance and they are arranged to be coupled to the motor shaft at selected distances above the ground and above the level of bead 12 of the housing skirt 11 as a matter of safety precaution and for the remarkably effective suppression of the noise of the whirling parts.

The arrangement for connecting the disc and blade for rotation with the motor shaft is inexpensive, safe and simple. The adapter member 32 is shown herein as having an internal tapped bore 34 with a shoulder at 35 to securely mount it on the existing threaded end 36 of the motor shaft 31. It will be understood that other known forms of connection between the shaft and adapter may be employed in lieu of the illustrated threaded connection and that the purpose of the adapter is to provide on the end of shaft 31 a threaded bore 37 into which the end of a simple draw up clamping bolt 38 is entered to clamp the disc and the blade for rotation with the shaft as will now be explained in detail in connection with the adjustment of the blade for various grass cutting heights.

Figures 3, 4, 5, 6:
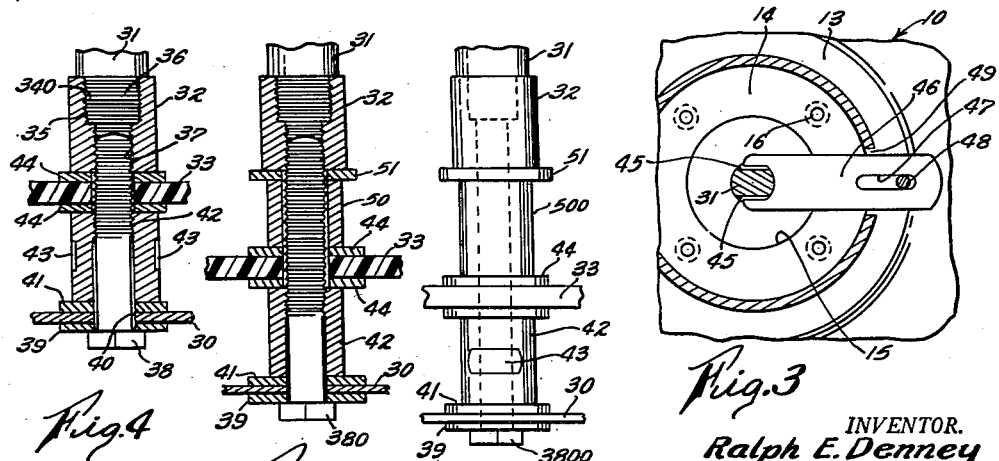
Fig. 3 is a fragmental cross sectional view taken on line 3—3 of Fig. 2 and showing a temporary shaft holder operatively in position.
Fig. 4 is an enlarged vertical sectional view showing the adjustment of the disc and cutting blade for a maximum grass cutting height.
Fig. 5 is an enlarged vertical sectional view showing the arrangement of the disc and blade for an intermediate grass cutting height.
Fig. 6 is an enlarged elevational view showing the arrangement of the disc and blade for a minimum grass cutting height.

Reference is first made to Fig. 4 which shows the arrangement for the selected maximum cutting height of say two and one-half inches above the ground. A short bolt 38 has a friction washer 39 placed against the head thereof and the blade 30 has its center perforation 40 passed over the bolt so that the blade rests flatwise on the washer 39. A second friction washer 41 is now placed over the bolt on top of blade 30. A disc spacing collar 42 is desirably provided, at its upper ends at least, with internal threads to engage the threads of bolt 38. These parts are assembled without the use of tools and may be relied upon to tighten adequately when the fully assembled structure is rotating under the power of the motor. However, I provide opposed flats 43—43 on the exterior of said collar 42 to receive a holding wrench when it is desired to remove the blade and disc assembly by unscrewing the bolt with a second wrench. The disc 33 interposed between friction washers 44—44 is disposed on the top of spacer 42 and the bolt is threaded into the bore 37 of the adapter without the use of tools. The length of the draw up clamping bolt is selected so that the end of the bolt amply clears the end of the motor shaft to assure positive clamping of the parts and adequate self tightening during normal operation of the mower. As an added or as an alternative means for disconnecting the parts I also may provide flats 45 on opposite sides of the motor shaft 17 and a removable, self holding wrench 46 which has a slot 47 to receive a fixed pin 48 on the dome 13 of the housing and be entered into and removed from operative position through an aperture 49 in the base of the vertical motor or at another selected location.

To provide for an intermediate grass cutting height, of say two inches, I replace bolt 38 with a longer bolt 380 on which the parts 39, 30, 41, 42, 33 and 44 are now placed, and a smooth bored spacer 50 and a friction washer 51 are added before entering the end of bolt 380 into the adapter as tightly as possible with the fingers (see Fig. 5).

In order to further extend the spacing between the end of the motor shaft 31 and the blade 30 to provide the shortest cutting of the grass, a still longer bolt 3800 is used and a longer spacer collar 500 is substituted for the spacer 50 of Fig. 5 (see Fig. 6). The blade 30 in this case is still within the vertical limits of the skirt 11.

When the motor is energized the parts will tighten to adequately clamp the disc and blade for cutting thick tall grass, however should the blade conceivably strike an immovable object the frictional bind of washers 39—41 will yield to superior force and allow the shaft and the attached parts to turn independently of the blade. I further prefer to utilize an electric motor having any suitable overload circuit breaker such as 52 to break the circuit and avoid blowing a fuse in the supply circuit to the mower.

In order to afford easy separation of the handle member 27 from the mower, I prefer that the length of supply cable or insulated electric cord 53 be removably supported by a suitable spring clip 54 on the handle 27 and that a female type connector plug 55 of the self holding or latching type be supplied on the end of the cable 53. A companion male connector plug 56 is mounted in a receptacle box 57 which is secured to housing 10 in the embodiment shown and has an on-off, foot operated toggle switch 58 therein to electrically connect or disconnect cable 53 with a female connector socket 580 of known type which is also mounted in box 57. Motor 17 has a short connector cable 59 with a male plug 60 for insertion in the socket 580. It will be understood the box 57 or its equivalent may be located elsewhere than here illustrated if so desired, particularly if a manual type toggle switch is desired instead of the foot operated toggle switch 58.

What is claimed is:

1. In a power mower the combination of a wheel supported casing, power means on the casing provided with a vertical drive shaft depending into the casing at the center thereof, an upper disc and a lower bar type cutter blade secured to the shaft for rotation therewith in vertically spaced parallel relation, and an upstanding, circumferentially positioned, imperforate skirt for the casing concentrically surrounding the periphery of the disc in closely spaced relation, said casing having a series of air inlet perforations arranged in a circle above and concentric with the periphery of the disc.

2. In a mower of the class described a wheel supported circular housing having a horizontally disposed top provided with a circular row of air inlet perforations spaced around the periphery thereof, a downwardly depending peripheral skirt for the top, a power means on the top having a vertical shaft depending concentrically into the housing, a horizontal bar type blade, a horizontal disc of a diameter substantially equal to the length of the blade, and means to mount said disc and blade concentrically on the shaft for rotation therewith and in vertically spaced relation to each other in the upper and lower areas, respectively, within the vertical limits of said skirt, the ends of the blade and the periphery of the disc being movable by the shaft in paths closely adjacent the inner circumferential surface of the skirt.

3. In a power mower a housing having a circular top and a continuous peripheral skirt depending therefrom, an upper horizontal disc and a lower horizontal cutter blade positioned for rotation concentrically within the skirt, a power means on the housing having a vertical shaft depending into the center interior of the housing, means for securing the disc to the shaft and the blade to said shaft in horizontal positions and in vertically spaced relation to each other with the path of travel of the periphery of the disc and the ends of the blade defining a free downdraft passage down across the inner face of said skirt, the housing having air inlet perforations closely adjacent its juncture with the top of the skirt, and exteriorly disposed support wheels mounted on the skirt for travelably supporting the bottom edge of the skirt substantially parallel to the ground.

4. In a power mower, a housing having a circular top wall and a continuous peripherally located depending skirt, support wheels for the housing, a power means mounted on the housing having a vertical drive shaft depending into the center of the housing, a horizontal disc mounted concentrically on the upper portion of the drive shaft with its periphery in close proximity to the upper portion of the interior surface of the skirt, a horizontal blade mounted concentrically on the lower portion of the drive shaft with its ends located adjacent the lower portion of the interior surface of the skirt, and vent means in the top wall of the housing for admitting air into the space bounded by the top wall of the housing and the disc.

5. In a power mower the combination of a wheel supported housing, power means on the housing provided with a vertical drive shaft depending into the housing, an upper disc and a lower bar type cutter blade secured to the shaft for rotation therewith within the housing in vertically spaced parallel relation to each other, and an upstanding skirt for the housing surrounding the periphery of the disc in spaced relationship therewith, said housing having a series of air inlet perforations above the disc.

6. In a power mower, a housing having a top wall and a depending skirt joined thereto, support wheels for the housing, a power means mounted on the housing having a vertical drive shaft depending into the housing, a horizontal disc mounted concentrically on the upper portion of the drive shaft with its periphery close to the upper portion of the interior surface of the skirt, a horizontal blade mounted concentrically on the lower portion of the drive shaft with its ends located adjacent the lower portion of the interior surface of the skirt and vent means in the top wall of the housing for admitting air into the space bounded by the top wall of the housing and disc.

References Cited in the file of this patent

UNITED STATES PATENTS

| | | |
|---|---|---|
| 1,970,302 | Gerhardt | Aug. 14, 1934 |
| 2,641,100 | Sylvester | June 9, 1953 |
| 2,651,530 | Blydenburgh | Sept. 8, 1953 |
| 2,659,191 | Miller | Nov. 17, 1953 |
| 2,663,984 | Clark | Dec. 29, 1953 |
| 2,669,827 | Brownlee | Feb. 23, 1954 |
| 2,675,661 | Titzer | Apr. 20, 1954 |
| 2,675,662 | Kroll | Apr. 20, 1954 |